United States Patent [19]

Klang et al.

[11] Patent Number: 5,436,313
[45] Date of Patent: Jul. 25, 1995

[54] PROCESS FOR MAKING A POLYETHERESTER

[75] Inventors: Jeffrey A. Klang, Exton, Pa.; Lau S. Yang, Wilmington, Del.

[73] Assignee: ARCO Chemical Technology, L.P., Greenville, Del.

[21] Appl. No.: 220,149

[22] Filed: Mar. 30, 1994

[51] Int. Cl.$^6$ .............................................. C08G 63/82
[52] U.S. Cl. ................................. 528/274; 528/272; 528/274; 528/275; 528/280; 528/281; 528/282; 528/283; 528/286; 528/306; 528/307; 524/711; 524/773; 524/777; 524/783; 524/784; 524/785; 524/786; 524/845; 525/437; 522/1; 522/93; 522/102
[58] Field of Search ............... 528/272, 274, 275, 280, 528/281, 282, 283, 286, 306, 307; 524/711, 773, 777, 783, 784, 785, , 786, 845; 525/437; 522/1, 93, 102

[56] References Cited

U.S. PATENT DOCUMENTS 5,254,723 10/1993 Yang et al. .......................... 560/240
5,319,006 6/1994 Yang et al. .......................... 523/500

FOREIGN PATENT DOCUMENTS 3435014 3/1986 Germany .

OTHER PUBLICATIONS

Burwell, Jr., "The Cleavage of Ethers", *Chem. Rev.* (1954) 615.

*Primary Examiner*—Samuel A. Acquah
*Attorney, Agent, or Firm*—Jonathan L. Schuchardt

[57] ABSTRACT

An improved process for making polyetheresters is disclosed. A polyether is reacted with an anhydride in the presence of a strong protic acid or a metal salt of a strong protic acid in an amount effective to promote insertion of the anhydride into carbon-oxygen bonds of the polyether to produce the polyetherester. Polyetheresters made by the process of the invention are useful in a wide variety of applications, particularly in the polyurethane and unsaturated polyester industries.

34 Claims, No Drawings

PROCESS FOR MAKING A POLYETHERESTER

FIELD OF THE INVENTION

The invention relates to a process for making polyetheresters. In particular, the invention is a process for preparing polyetheresters from polyethers and anhydrides using protic acids or their metal salts as catalysts. Polyetheresters are useful for a wide variety of applications, particularly in the unsaturated polyester and polyurethane industries.

BACKGROUND OF THE INVENTION

Recently, we reported the discovery of a new reaction in which a cyclic anhydride randomly inserts into carbon-oxygen bonds of a polyether to generate a polymeric composition having both ether and ester functionalities (see application Ser. No. 07/979,760, now U.S. Pat. No. 5,319,006). A Lewis acid such as zinc chloride or zinc bromide catalyzes the reaction.

When a polyether polyol reacts with a cyclic, saturated anhydride, for example, the product is a saturated polyetherester polyol useful for polyurethane applications. Cyclic, unsaturated anhydrides such as maleic anhydride can be used in the process to make unsaturated polyetherester resins. The unsaturated resins can be reacted with vinyl monomers to produce cured polyetherester products.

Compared with the synthesis of conventional unsaturated polyester resins, the process for making polyetheresters by anhydride insertion has great flexibility. The average polyether chain length between ester linkages and the crosslinkability of the polyetherester are controlled by simply adjusting the proportion of cyclic, unsaturated anhydride used. Products having a wide range of unsaturation levels are available from a single polyether polyol and a single cyclic, unsaturated anhydride.

We also applied the Lewis acid-catalyzed anhydride-insertion process to the reaction of polyethers and acyclic anhydrides to make glycol diesters (U.S. Pat. No. 5,254,723). Using this process, a relatively crude polyether polyol mixture can be converted with acetic anhydride to a mixture of glycol diacetates. The glycol diacetates are easily purified by distillation, and can be used as solvents or chemical intermediates.

Unfortunately, the Lewis acid-catalyzed insertion process has its disadvantages. First, the activity of Lewis acids in the process is somewhat lower than desirable. Typically, at least about 1 wt. % of the Lewis acid catalyst is needed for good activity in making the polyetherester. Second, the polyetherester products often have a higher degree of color than is desirable. Third, the presence of high levels of residual Lewis acid catalysts in the polyetherester product can have an unfavorable impact on performance in various end uses. Finally, Lewis acids are often not satisfactory for use in manufacturing operations because they tend to attack reactors and other processing equipment.

An improved process for making polyetheresters by anhydride insertion is needed. Preferably, the process could be used, like the Lewis acid-catalyzed process, to make a wide variety of polyetheresters. Preferably, the process would use low catalyst levels to reduce catalyst costs and minimize the impact of residual catalyst on polyetherester performance. A preferred process would give low-color products. In addition, a process that could be used with ordinary reactors and manufacturing equipment is needed.

SUMMARY OF THE INVENTION

The invention is an improved process for making polyetheresters from polyethers. The process comprises reacting a polyether with an anhydride in the presence of a protic acid or a metal salt of a protic acid in an amount effective to promote insertion of the anhydride into carbon-oxygen bonds of the polyether to produce the polyetherester. Protic acids useful in the invention have a pKa less than about 0. The metal salts are derived from these protic acids.

We surprisingly found that strong protic acids and metal salts of these acids offer several key advantages over Lewis acids, which were previously found to promote anhydride insertion. First, the catalysts have much higher activity. Consequently, low catalyst levels can be used, which reduces cost and minimizes any adverse impact of catalyst residues on polyetherester quality and performance. Second, in contrast to processes performed with Lewis acid catalysts, the process of the invention can be used with ordinary reactors and manufacturing equipment. Third, the products made by the process of the invention are relatively low in color compared with products made using Lewis acids. Finally, polyetheresters made by the process of the invention cure faster and more completely in crosslinking reactions with vinyl monomers compared with polyetheresters made with Lewis acids, and consequently they give cured products with improved physical properties.

Like the Lewis acid-catalyzed process, the process of the invention is highly flexible. Because the average polyether chain length between ester linkages can be conveniently controlled by adjusting the proportion of anhydride used, a spectrum of products can be made from a few simple starting materials. The products are useful in a wide variety of end uses, particularly in the polyurethane and unsaturated polyester industries.

DETAILED DESCRIPTION OF THE INVENTION

In the process of the invention, a polyether reacts with an anhydride in the presence of a strong protic acid or a metal salt of a strong protic acid in an amount effective to promote insertion of the anhydride into carbon-oxygen bonds of the polyether to produce a polyetherester.

Polyethers suitable for use in the invention are those derived from base or acid-catalyzed ring-opening polymerization of cyclic ethers such as epoxides, oxetanes, oxolanes, and the like. The polyethers have repeat units of oxyalkylene groups (—O—A—) in which A has from 2 to 10 carbon atoms, preferably from 2 to 4 carbon atoms. The polyethers can have different end groups, depending upon how the polyethers are made or modified. For example, the polyether can have hydroxyl, ester, ether, acid, olefinic, or amino end groups, or the like, or combinations of these. Mixtures of different types of polyethers can be used.

Preferred polyethers for the process of the invention are polyether polyols. Suitable polyether polyols include, for example, polyoxypropylene polyols, polyoxyethylene polyols, ethylene oxide-propylene oxide copolymers, polytetramethylene ether glycols, oxetane polyols, and copolymers of tetrahydrofuran and epoxides. Typically, these polyols will have average hydroxyl functionalities from about 2 to about 8, and number average molecular weights from about 250 to about 25,000. The polyether polyols can be recycled polyols derived from a polyurethane foam, elastomer, sealant, or the like.

An anhydride is used in the process of the invention. The anhydride can be cyclic or acyclic, saturated or unsaturated. In a "cyclic" anhydride, the anhydride functionality is contained within a ring, such as in phthalic anhydride and maleic anhydride. "Acyclic" anhydrides, which include acetic anhydride, propionic anhydride, and the like, have no such ring. "Saturated" anhydrides contain no ethylenic unsaturation, although they may contain aromatic rings. Phthalic anhydride, propionic anhydride, and succinic anhydride are examples of saturated anhydrides. "Unsaturated" anhydrides contain ethylenic unsaturation. This unsaturation becomes incorporated into the polyetherester, and can be used for crosslinking. Examples include maleic anhydride, itaconic anhydride, and the like.

Specific examples of suitable anhydrides for use in the invention include, but are not limited to, acetic anhydride, propionic anhydride, maleic anhydride, phthalic anhydride, succinic anhydride, tetrahydrophthalic anhydride, citraconic anhydride, itaconic anhydride, and aryl-, alkyl- and halogen-substituted derivatives of these. Mixtures of anhydrides can be used. Where unsaturated polyetheresters are desired, maleic anhydride or mixtures of maleic anhydride and phthalic anhydride are particularly preferred.

The relative amounts of polyether and anhydride used can vary substantially depending upon the type of product desired, the desired degree of crosslinkability, and other factors. Generally, it is preferred to use an amount of anhydride within the range of about 2 to about 80 weight percent based on the amount of polyetherester product to be made. A more preferred range is from about 10 to about 50 weight percent; most preferred is the range from about 20 to about 40 weight percent.

A strong protic acid catalyzes the process of the invention. Suitable protic acids are inorganic and organic protic acids that have a pKa less than about 0. Generally, the acids will be stronger than organic carboxylic acids. Suitable acids include arylsulfonic acids, alkylsulfonic acids, and halogenated alkyl- and arylsulfonic acids. Also suitable are hydrogen halides, halosulfonic acids, tetrafluoroboric acid, heteropolyacids, and sulfuric acid. Mixtures of different acids can be used. Examples of suitable acids include, but are not limited to, p-toluenesulfonic acid, trifluoromethanesulfonic acid (triflic acid), trichloromethanesulfonic acid, hydrochloric acid, hydrobromic acid, hydriodic acid, tetrafluoroboric acid, sulfuric acid, phosphotungstic acid, phosphomolybdic acid, and the like. Preferred protic acids are sulfuric acid, p-toluenesulfonic acid, and phosphotungstic acid.

The protic acid is used in an amount effective to promote random insertion of the anhydride into polyether carbon-oxygen bonds and produce a polyetherester. The preferred amount to be used depends on many factors, including the desired reaction rate, the type of polyether and anhydrides used, catalyst type, reaction temperature, and other considerations. If the catalyst is omitted, anhydride insertion does not occur; with too little catalyst, the insertion reaction is slower than desirable. Generally, it is preferred to use an amount of protic acid within the range of about 0.01 to about 1 weight percent based on the amount of polyether used. A more preferred range is from about 0.05 to about 0.5 weight percent.

We also found that metal salts of strong protic acids are effective catalysts for the process of the invention. The metal salts are derived from protic acids that have a pKa less than about 0. Thus, the salts useful in the invention are generally derived from the protic acids described above as suitable for use in the process. Mixtures of strong protic acids and metal salts of the acids can be used.

Preferred metal salts useful as catalysts for the process of the invention are metal salts of arylsulfonic acids, alkylsulfonic acids, halogenated aryl- and alkylsulfonic acids, tetrafluoroboric acid, sulfuric acid, heteropolyacids, and halosulfonic acids. Sulfonic acid salts, especially triflic acid salts, are particularly preferred.

Preferred metal salts include metal salts of strong protic acids (pKa less than about 0) in which the metal is selected from Group IA, Group IIA, Group IIB, Group IB, Group IIIA, Group IVA, Group VA, and Group VIII. Thus, the metal can be, for example, lithium, potassium, magnesium, zinc, copper, aluminum, tin, antimony, iron, nickel.

Suitable metal salts include, but are not limited to, lithium triflate, sodium triflate, magnesium triflate, zinc triflate, copper(II) triflate, zinc tetrafluoroborate, zinc p-toluenesulfonate, aluminum triflate, silver tetrafluoroborate, iron(II) tetrafluoroborate, nickel(II) tetrafluoroborate, tin(II) triflate, and the like. Mixtures of metal salts can be used.

The metal salt is used in an amount effective to promote random insertion of the anhydride into polyether carbon-oxygen bonds and produce a polyetherester. As with the protic acid catalysts, the preferred amount to be used depends on many factors, including the desired reaction rate, the type of polyether and anhydride used, catalyst type, reaction temperature, and other factors. Generally, it is preferred to use an amount of metal salt within the range of about 1 part per million ($10^{-4}$ wt. %) to about 1 weight percent based on the amount of polyether used. A more preferred range is from about 10 parts per million to about 0.5 weight percent.

Any convenient reaction temperature can be chosen for making polyetheresters by the process of the invention provided that the temperature is sufficient to promote insertion of the anhydride into the polyether. Generally, however the reaction is too slow to be practical at temperatures below about 60° C. Preferably, the process is performed at a temperature within the range of about 80° C. to about 250° C. A more preferred range is from about 100° C. to about 220° C.; most preferred is the range from about 150° C. to about 200° C.

The process of the invention is conveniently performed by combining the polyether, anhydride, and catalyst in any desired order or manner, and heating the mixture at the desired reaction temperature under conditions effective to promote anhydride insertion to produce a polyetherester. The progress of the reaction can be followed by measuring the acid number, which will decrease and level off as the reaction proceeds. The process can be performed batchwise, semi-batchwise, or continuously as desired.

Polyetherester products obtained from the process of the invention commonly have a large proportion of carboxylic acid end groups. It is generally preferred to heat the polyetherester product with a glycol such a propylene glycol, ethylene glycol, dipropylene glycol, or the like, to esterify these acid groups with the glycol. The resulting polyetheresters have hydroxyl end groups and lower acid numbers. Compositions with low acid numbers are often needed for use in certain applications, such as, for example, formulation into polyurethane sealants and elastomers.

The amount of glycol used is preferably at least about 1 equivalent of glycol for each residual carboxylic acid end group. Typically, this amounts to heating the polyetherester with at least about 5–10 wt. % of the glycol. The glycol is typically heated with the polyetherester at about the same temperature as that used for the insertion reaction until the acid number of the mixture drops to the desired level. Any excess glycol is removed by stripping. A thermosettable unsaturated polyetherester resin might be made, for example, by reacting a polyether polyol and 30 wt. % maleic anhydride to give a polyetherester product having an acid number in the 100 to 200 mg KOH/g range, then heating the product with 10 wt. % propylene glycol to produce a new polyetherester having an acid number within the range of about 30 to about 80 mg KOH/g.

It is preferred, although not necessary, to perform the process under an inert atmosphere of nitrogen, argon, or the like. Preferably, the reaction mixture is well agitated during the anhydride-insertion process. Reactions are typically complete within 5–12 h.

A wide variety of polyetherester products can be made, depending on the type of anhydride(s) used, the relative proportion of unsaturated to saturated anhydride, the relative proportion of anhydride to polyether, the nature and molecular weight of the polyether component, and other factors.

An unsaturated polyetherester resin can be made by reacting the polyether with at least some proportion of a cyclic, unsaturated anhydride such as maleic anhydride. The unsaturated polyetherester resin can be used like conventional unsaturated polyester resins. For example, the polyetherester resin can be combined with a vinyl monomer such as styrene, and heated in the presence of a free-radical initiator to produce a cured polyetherester product. Suitable vinyl monomers and free-radical initiators are those well known in the art for curing conventional unsaturated polyesters. Specific examples of other useful vinyl monomers and free-radical initiators appear in application Ser. No. 07/979,760, now U.S. Pat. No. 5,319,006, the teachings of which are incorporated herein by reference.

Saturated and unsaturated polyetheresters made by the process of the invention from polyethers and cyclic anhydrides will be useful, for example, in polyurethane foams, elastomers, sealants, or adhesives, as replacements for polyether or polyester polyols.

Polyetherester products derived from reaction of a polyether and an acyclic anhydride will generally have different uses. If a large excess of the acyclic anhydride is used, the products will be low molecular weight glycol diesters, potentially useful as solvents or chemical intermediates (see, for example, U.S. Pat. No. 5,254,723). Polyethers having one or more ester end groups will generally result from reaction of polyethers with a smaller proportion of the anhydride. The products will have lower molecular weights than the starting polyether because chain scission results from insertion of an acyclic anhydride. Because the insertion occurs at random places in the polyether chain, the products will also have broad molecular weight distributions. These products are expected to have utility in such specialized applications as functional fluids and drilling muds, as well as in various polyurethane and unsaturated polyester applications. The process of the invention can be tailored to give products having the desired functionalities and properties.

The process of the invention offers several distinct advantages over the Lewis-acid catalyzed process for making polyetheresters from polyethers. First, the amount of strong protic acid or metal salt is much lower than the amount of Lewis acid needed. The Lewis acid-catalyzed process typically requires at least about 1 wt. % of catalyst (see Comparative Example 8, Table 1), while the process of the invention is routinely performed with as little as 0.2 wt. % of strong protic acid (see Example 2), and, remarkably, as little as 0.003 wt. % (30 ppm) of a metal salt (see Examples 1 and 6). The ability to use less catalyst saves on catalyst cost.

High levels of residual catalyst can adversely impact the performance of polyetherester resins. The levels of Lewis acid previously used are high enough to impact performance. We found that the ability to use lower catalyst levels with the strong protic acids and metal salts results in better polyetherester products (see Example 9 and Comparative Example 10).

Polyetherester resins made by the process of the invention cure more rapidly than polyetherester resins made with Lewis acid catalysts (see the results of the SPI gel test for Examples 1–2 and Comparative Example 8). Faster, more complete curing with the polyetherester resins of the invention results in products with improved physical properties (see Example 9 and Comparative Example 10).

Another advantage of the process of the invention is that the products obtained with strong protic acid or metal salts as catalysts tend to be significantly lower in color. Particularly where the final product needs to be clear and colorless (such as a coating), low color is important.

Finally, the process of the invention can be used with ordinary reactors and manufacturing equipment. Lewis acids are generally not satisfactory for use in manufacturing operations because they tend to attack the metals used in ordinary equipment, particularly at the rather high catalyst levels needed with Lewis acids. In contrast, many of the strong protic acids and metal salts useful in the process of the invention do not attack ordinary manufacturing reactors and equipment.

The following examples merely illustrate the invention. Those skilled in the art will recognize many variations that are within the spirit of the invention and scope of the claims.

EXAMPLE 1

Preparation of a Polyetherester Resin from a Polyether (Zinc. TriflateCatalyst) and Curing of the Resin with Styrene A one-liter resin kettle equipped with a mechanical stirrer, distillation head, thermocouple, and nitrogen inlet is charged with polyether triol (400 g, 3000 molecular weight propylene oxide/ethylene oxide copolymer containing about 10 wt. % of recurring units derived from ethylene oxide), maleic anhydride (171 g), and zinc triflate (0.017 g). The mixture is heated to 185° C. for 3.5 h, at which point the acid number has dropped to 150. Propylene glycol (63 g) is added, and heating is continued for another 3 h, giving a product with acid number 62. After vacuum stripping, a clear, light yellow polyetherester resin is obtained.

The polyetherester resin is blended with styrene (60 wt. % resin). In the SPI 180° F. Gel Time test, the resin shows a peak exotherm of 364° F. at 7 minutes, 37 seconds. See Table 1.

EXAMPLE 2

Preparation of a Polyetherester Resin from a Polyether (p-Toluene-sulfonic acid Catalyst) and Curing of the Resin with Styrene A two-liter resin kettle equipped as described in Example 1 is charged with the same polyether triol (1000 g), maleic anhydride (428 g), and p-toluenesulfonic acid (2.86 g). The mixture is heated to 185° C. for 6 h, at which time the acid number has dropped to 147. Propylene glycol (142 g) is added, and the heating is continued for another 3 h, giving a product with acid number 80. After vacuum stripping, a clear, light yellow polyetherester resin is obtained.

The polyetherester resin is blended with styrene (60 wt. % resin). In the SPI 180° F. Gel Time test, the resin shows a peak exotherm of 375° F. at 7 minutes, 32 seconds. See Table 1.

EXAMPLES 3-7

Preparation of Polyetherester Resins from Polyethers using Strong Protic Acids (pKa<0) and Metal Salts of Strong Protic Acids The procedure of Example 1 is followed using various strong protic acids (pKa less than about 0) or metal salts of strong protic acids as the catalyst. The amount of catalyst used, reaction times, and product colors appear in Table 1.

Each of the resulting polyetherester resins is tested in the SPI 180° F. Gel Time test; peak exotherms observed in this test also appear in Table 1.

The results of Examples 1-7 show that strong acids (pKa less than about 0) and metal salts of strong acids are effective catalysts for making polyetheresters from polyethers and anhydrides by the process of the invention.

COMPARATIVE EXAMPE 8

Preparation of a Polyetherester Resin from a Polyether(Zinc Chloride Catalyst) and Curing of the Resin with Styrene A one-liter resin kettle equipped as in Example 1 is charged with the same polyether triol (400 g), maleic anhydride (171 g), and zinc chloride (5.71 g). The mixture is heated to 185° C. for 8.5 h, at which point the acid number has dropped to 140. Propylene glycol (63 g) is added, and the heating is continued for another 3.5 h, giving a product with acid number 63. After vacuum stripping, a slightly cloudy, brown polyetherester resin is obtained.

The polyetherester resin is blended with styrene (60 wt. % resin). In the SPI 180° F. Gel Time test, the resin shows a peak exotherm of 342° F. at 11 minutes, 10 seconds.

This example shows that polyetherester resins can also be made with Lewis acids such as zinc chloride, but a higher level of catalyst is needed, the polyetherester resin is higher in color, and the resin is somewhat more sluggish in reacting in the SPI 180° F. Gel Time test compared with resins made by the process of the invention.

EXAMPLE 9

Preparation of a Cured Polyetherester Product: Resin made with Zinc Triflate Catalyst The polyetherester resin of Example 1 is blended with styrene (60 wt. % resin) and is poured into a mold and cured with cobalt naphthenate (0.5 wt. %) and methyl ethyl ketone peroxide (MEKP) (1.5 wt. %). The cured product has tensile strength=6400 psi, tensile modulus=337,000 psi, flex strength at 5% strain=12,200 psi, and flex modulus=360,000 psi.

COMPARATIVE EXAMPLE 10

Preparation of a Cured Polyetherester Product: Resin made with Zinc Chloride Catalyst The polyetherester resin of Comparative Example 8 is blended with styrene (60 wt. % resin) and is poured into a mold and cured with cobalt naphthenate (0.5 wt. %) and MEKP (1.5 wt. %). The cured product has tensile strength=4900 psi, tensile modulus=249,000 psi, flex strength at 5% strain=9,300 psi, and flex modulus=274,000 psi.

The results of Example 9 and Comparative Example 10 show that polyetheresters made by the process of the invention can offer performance advantages in cured polyetherester products compared with polyetherester resins made with Lewis acids.

COMPARATIVE EXAMPLES 11-12

Preparation of Polyetherester Resins from Polyethers using Weak Protic Acids (pKa>0)

The procedure of Example 1 is followed using 50% phosphoric acid (11 g) as the catalyst. The reaction mixture quickly turns dark brown. After heating for several hours, there is no change in the acid number, indicating that maleic anhydride is not being consumed. Similar results are obtained when oxalic acid (1.1 g) is used in place of phosphoric acid.

These results show that acids having a pKa greater than about 0 are not effective catalysts for the anhydride-insertion process of the invention.

EXAMPLE 13

Preparation of a Polyetherester Resin derived from Phthalic Anhydride and Maleic Anhydride A three-liter resin kettle equipped as in Example 1 is charged with the same polyether triol (1650 g), maleic anhydride (487 g), phthalic anhydride (326 g), and zinc triflate (0.074 g), and the mixture is heated to 185° C. After 6.5 h, the acid number is 150. Propylene glycol (425 g) is added, and the heating is continued for another 6 h until the acid number reaches 67. After vacuum stripping, a clear, light-yellow resin is obtained.

The polyetherester resin is blended with styrene (60 wt. % resin) and is cured with cobalt naphthenate (0.5 wt. %) and MEKP (1.5 wt. %) as described above to form a clear solid polyetherester product with a hard, smooth surface.

EXAMPLE 14

Preparation of a Polyetherester Resin derived from Maleic Anhydride and Polyethylene Glycol A three-neck round-bottom flask is charged with polyethylene glycol (1500 mol. wt., 100 g), maleic anhydride (43 g), and zinc triflate (0.07 g). The mixture is heated to 185° C. for 3.5 h, at which time the acid number has dropped to 94. Propylene glycol (28 g) is added, and heating is continued for 4.5 h, after which the acid number is 45. After vacuum stripping, a clear, yellow liquid is obtained. The resin is blended with styrene (60 wt. % resin) and is cured as described above to give a clear, hard product.

EXAMPLES 15–21

Polyetherester Resin Preparation

The method of Example 1 is repeated with each of the following compounds as a catalyst: lithium triflate (Li(O$_3$SCF$_3$)), aluminum triflate (Al(O$_3$SCF$_3$)$_3$), tin(II) triflate (Sn(O$_3$SCF$_3$)$_2$), silver triflate (Ag(O$_3$SCF$_3$)), nickel(II) tetrafluoroborate (Ni(BF$_4$)$_2$), iron(II) tetrafluoroborate (Fe(BF$_4$)$_2$), and zinc tetrafluoroborate (Zn(BF$_4$)$_2$). In each case, a polyetherester product is obtained.

TABLE 1

Preparation of Polyetheresters from Polyethers by Anhydride Insertion

| Ex. # | Catalyst | Wt. % cat. | Rxn. Time (h) | Peak Exotherm (°F.): Gel Test | Color |
|---|---|---|---|---|---|
| 1 | zinc triflate | 0.003 | 6.5 | 364 | yellow |
| 2 | p-toluene-sulfonic acid | 0.2 | 9.0 | 375 | light yellow |
| 3 | sulfuric acid | 0.4 | 5.0 | 354 | yellow |
| 4 | phosphotungstic acid | 0.18 | 8.5 | 350 | light yellow |
| 5 | zinc p-toluene-sulfonate | 0.5 | 11 | 370 | light yellow |
| 6 | copper triflate | 0.003 | 5.0 | 290 | yellow |
| 7 | magnesium triflate | 0.03 | 10 | 340 | yellow |
| C8 | zinc chloride | 1.0 | 12 | 342 | amber |
| C11 | phosphoric acid | | *** | NA | NA |
| C12 | oxalic acid | | *** | NA | NA |

***Heating discontinued after several hours with no reaction evident.
NA = Not applicable because a resin product was not obtained.

The preceding examples are meant only as illustrations; the following claims define the scope of the invention.

We claim:

1. A process for making a polyetherester from a polyether, said process comprising reacting the polyether with an anhydride in the presence of a protic acid having a pKa less than about 0 in an amount effective to promote random insertion of the anhydride into polyether carbon-oxygen bonds and produce a polyetherester.

2. The process of claim 1 wherein the polyether is a polyether polyol selected from the group consisting of polyoxypropylene polyols, polyoxyethylene polyols, ethylene oxide-propylene oxide copolymers, polytetramethylene ether glycols, oxetane polyols, and copolymers of tetrahydrofuran and epoxides.

3. The process of claim 1 wherein the anhydride is a cyclic, unsaturated anhydride.

4. The process of claim 1 wherein the anhydride is an acyclic anhydride.

5. The process of claim 1 wherein the protic acid is selected from the group consisting of arylsulfonic acids, alkylsulfonic acids, halogenated alkyl and arylsulfonic acids.

6. The process of claim 1 wherein the protic acid is selected from the group consisting of hydrogen halides, halosulfonic acids, tetrafluoroboric acid, heteropolyacids, and sulfuric acid.

7. The process of claim 1 wherein the protic acid is used in an amount within the range of about 0.01 to about 1 weight percent based on the amount of polyether.

8. The process of claim 1 performed at a temperature within the range of about 100° C. to about 220° C.

9. The process of claim 1 wherein the polyetherester is further reacted with a glycol to give a new polyetherester that has a reduced acid number.

10. A process for making an unsaturated polyetherester resin from a polyether, said process comprising reacting the polyether with a cyclic, unsaturated anhydride in the presence of a protic acid having a pKa less than about 0 in an amount effective to promote random insertion of the anhydride into polyether carbon-oxygen bonds and produce an unsaturated polyetherester resin.

11. The process of claim 10 wherein the protic acid is selected from the group consisting of arylsulfonic acids, alkylsulfonic acids, halogenated alkyl and arylsulfonic acids.

12. The process of claim 10 wherein the protic acid is selected from the group consisting of hydrogen halides, halosulfonic acids, tetrafluoroboric acid, heteropolyacids, and sulfuric acid.

13. The process of claim 10 wherein the polyetherester is further reacted with a glycol to give a new polyetherester that has a reduced acid number.

14. A process for making a polyetherester from a polyether, said process comprising reacting the polyether with an anhydride in the presence of a metal salt of a protic acid, wherein the protic acid has a pKa less than about 0, in an amount effective to promote random insertion of the anhydride into polyether carbon-oxygen bonds and produce a polyetherester.

15. The process of claim 14 wherein the polyether is a polyether polyol selected from the group consisting of polyoxypropylene polyols, polyoxyethylene polyols, ethylene oxide-propylene oxide copolymers, polytetramethylene ether glycols, oxetane polyols, and copolymers of tetrahydrofuran and epoxides.

16. The process of claim 14 wherein the anhydride is a cyclic, unsaturated anhydride.

17. The process of claim 14 wherein the anhydride is an acyclic anhydride.

18. The process of claim 14 wherein the metal salt is a metal salt derived from a protic acid selected from the group consisting of arylsulfonic acids, alkylsulfonic acids, halogenated alkyl and arylsulfonic acids, tetrafluoroboric acid, sulfuric acid, heteropolyacids, and halosulfonic acids.

19. The process of claim 14 wherein the metal salt includes a metal selected from the group consisting of Group IA, Group IIA, Group IIB, Group IB, Group IIIA, Group IVA, Group VA, and Group VIII.

20. The process of claim 14 wherein the metal salt is used in an amount within the range of about 1 part per million to about 1 weight percent based on the amount of polyether.

21. The process of claim 14 wherein the polyetherester is further reacted with a glycol to give a new polyetherester that has a reduced acid number.

22. A process for making an unsaturated polyetherester resin from a polyether, said process comprising reacting the polyether with a cyclic, unsaturated anhydride in the presence of a metal salt of a protic acid, wherein the protic acid has a pKa less than about 0, in an amount effective to promote random insertion of the anhydride into polyether carbon-oxygen bonds and produce an unsaturated polyetherester resin.

23. The process of claim 22 wherein the metal salt is a metal salt derived from a protic acid selected from the group consisting of arylsulfonic acids, alkylsulfonic acids, halogenated alkyl and arylsulfonic acids, tetrafluoroboric acid, sulfuric acid, heteropolyacids, and halosulfonic acids.

24. The process of claim 22 wherein the polyetherester is further reacted with a glycol to give a new polyetherester that has a reduced acid number.

25. A process for making a cured polyetherester product, said process comprising:
 (a) preparing an unsaturated polyetherester resin by the process of claim 10;
 (b) combining the unsaturated polyetherester resin with a vinyl monomer and a free-radical initiator; and
 (c) heating the mixture at a temperature effective to produce the cured polyetherester product.

26. The process of claim 25 wherein the unsaturated polyetherester resin from step (a) is further reacted with a glycol to give a new polyetherester that has a reduced acid number prior to combining the resin with the vinyl monomer and free-radical initiator in step (b).

27. A process for making a cured polyetherester product, said process comprising:
 (a) preparing an unsaturated polyetherester resin by the process of claim 22;
 (b) combining the unsaturated polyetherester resin with a vinyl monomer and a free-radical initiator; and
 (c) heating the mixture at a temperature effective to produce the cured polyetherester product.

28. The process of claim 27 wherein the unsaturated polyetherester resin from step (a) is further reacted with a glycol to give a new polyetherester that has a reduced acid number prior to combining the resin with the vinyl monomer and free-radical initiator in step (b).

29. A polyetherester made by the process of claim 1.

30. An unsaturated polyetherester resin made by the process of claim 10.

31. A polyetherester made by the process of claim 14.

32. An unsaturated polyetherester resin made by the process of claim 22.

33. A cured polyetherester product made by the process of claim 25.

34. A cured polyetherester product made by the process of claim 27.

* * * * *